United States Patent [19]

Dattilo et al.

[11] 4,414,579
[45] Nov. 8, 1983

[54] INFORMATION TRANSMITTING AND RECEIVING STATION UTILIZING A COPIER-PRINTER

[75] Inventors: Anthony J. Dattilo; James F. McDonald, both of Longmont; Carl A. Queener, Lyons, all of Colo.

[73] Assignee: International Business Machines Corporation, Armonk, N.Y.

[21] Appl. No.: 108,114

[22] Filed: Dec. 28, 1979

[51] Int. Cl.³ .................. H04N 1/00; H04N 1/30; H04N 1/42
[52] U.S. Cl. .................. 358/256; 355/3 R; 355/24; 358/286; 358/300
[58] Field of Search ............... 358/300, 296, 302, 256, 358/286, 257, 259, 78, 263, 280; 355/3 R, 24

[56] References Cited

U.S. PATENT DOCUMENTS

| | | | |
|---|---|---|---|
| 1,851,748 | 3/1932 | Belin | 358/259 |
| 3,597,071 | 7/1971 | Jones | 355/3 R |
| 3,610,824 | 10/1971 | Hansen et al. | 358/286 |
| 4,075,662 | 2/1978 | Gall | 358/78 |
| 4,151,562 | 4/1979 | Tregay | 358/260 |
| 4,207,598 | 6/1980 | Reich et al. | 358/259 |

OTHER PUBLICATIONS

IBM Technical Disclosure Bulletin, Thorpe, Triple Function Box, vol. 15, No. 10, Mar. 1973, pp. 3259 and 3260.

Primary Examiner—Joseph A. Orsino, Jr.
Attorney, Agent, or Firm—Francis A. Sirr; John H. Holcombe; Joscelyn G. Cockburn

[57] ABSTRACT

A copier-printer is employed in conjunction with an optical scanner and associated character recognition logic to transmit information contained in a document over a telephone line or other communication line. The copier-printer is used to make a copy of the document which is stored in the duplex tray. When a buffer memory associated with the communication line is ready to receive further information for transmission, the copy is retrieved from the duplex tray and circulated through the copier-printer to the optical scanner. The scanner provides the information from the copy to the buffer memory in a non-coded format except to the extent that the character recognition logic is able to code some or all of the information. The copy is advanced from the scanner to a mailbox in the form of a limited access compartment at the bottom of the collator for the copier-printer. The copier-printer may be used to receive information transmitted over the communication line by temporarily storing the information in the buffer memory and then printing the information on paper which is routed to and stored in the mailbox. Information provided to the print buffer for printing can be checked for printing accuracy by scanning the resulting printed paper using the optical scanner and comparing the scanned information with the information originally entered in the print buffer.

17 Claims, 5 Drawing Figures

INFORMATION TRANSMITTING AND RECEIVING STATION UTILIZING A COPIER-PRINTER

BACKGROUND OF THE INVENTION

1. Field of the Invention

The present invention relates to information transmitting and receiving equipment, and more particularly to equipment for transmitting and receiving the information contained in documents over communication lines such as telephone lines.

2. History of the Prior Art

It is known to transmit the information contained in documents over communication lines such as telephone lines to a remote location where copies of the documents are reconstructed. Such "electronic mail" or facsimile systems typically scan the documents to provide electronic representations of the information contained therein with the representations being transmitted over the telephone line in the form of digital data. At the receiving end of the communication line the digital data may be used to modulate print apparatus for reconstructing the document being transmitted.

Presently known electronic mail or facsimile systems suffer from various limitations which may prove to be a substantial disadvantage for certain applications. One of the most serious limitations is the time required to transmit the data over the communication line. The data is typically presented in serial binary form to the communication line. While compression schemes may be employed, the data is typically in non-coded form. The practical result is that it may require as much as five minutes or longer to transmit a single page. Documents ten pages in length or greater may require as long as an hour or more to transmit. Aside from the substantial time required for an operator to present the document for scanning and transmission, further problems are created by the fact that the original document must be kept at the facsimile transmitter for a substantial period of time in the case of lengthy documents. This may take a substantial toll in man-hours in a given operation such as where clerical personnel who travel from a distant location to transmit the document must return with the original document and therefore must remain at the facsimile transmitter until transmission is completed.

One solution to the problem of tying up the original document during the lengthy transmission thereof is to translate the information contained in the document into electronic signals and store the signals. This frees the original document for removal as soon as translation is completed. Depending upon the length of the document, however, a substantial amount of information storage space may be required. For example, one page of non-coded information can require as much as six million bits of storage space. When multiplied by the many pages of a lengthy document, this translates into memory sizes which may be prohibitively large and costly.

Various types of imaging apparatus including copiers, printers and combinations thereof have been employed in connection with facsimile systems in an attempt to provide various improvements to such systems. However, such arrangements have been unable to provide practical solutions to the problems noted above. Examples of such arrangements are provided by IBM Technical Disclosure Bulletin, Vol. 15, No. 10, March 1973, pp. 3259 and 3260 where a light beam is used to scan a document placed on the document glass in a xerographic copier-printer to generate an electronic facsimile of the scanned image, and U.S. Pat. No. 3,597,071 of Jones which shows a reproduction system with a plurality of different imaging input devices including facsimile transmission means.

Accordingly, it is an object of the present invention to provide improved apparatus for use in the communication of documents.

It is a further object of the invention to provide improved apparatus for transmitting facsimiles of documents.

It is a still further object of the invention to provide an improved copier-printer system which may be used in the transmission and receipt of document facsimiles.

BRIEF DESCRIPTION OF THE INVENTION

Arrangements in accordance with the invention utilize a copier-printer in an information transmitting and receiving station. The copier-printer is initially used to make a copy of a document to be transmitted, thereby freeing the document for removal from the transmitting and receiving station. The copy is stored until a page of space is available in a buffer memory coupled to a communication line such as a telephone line. When space is available the copy is optically scanned, one page at a time, with the information derived from scanning being coded to the extent possible prior to storage in the buffer memory. When the communication line becomes available, the information stored in the buffer memory is transmitted over the line.

Arrangements in accordance with the invention may be used to receive as well as to transmit documents. Information received via the communication line is temporarily stored in the buffer memory, from which it is applied to the printer to print the information. The resulting printed documents are circulated to a limited access location within the arrangement for safekeeping pending controlled distribution.

The accuracy of original printing using the copier-printer can be verified in a read-after-write operation in accordance with the invention by optically scanning each printed document and storing the information derived therefrom in the buffer memory. The information may then be compared with the original print information stored in the print buffer of the copier-printer.

In a preferred embodiment of an information transmitting and receiving station utilizing a copier-printer in accordance with the invention, a document to be transmitted is copied onto paper fetched from the primary paper tray of the copier-printer with the resulting copy being stored in an auxiliary paper tray such as the duplex tray. As transmission space on the communication line becomes available, the copy is fetched from the duplex tray and is circulated through the copier-printer to an optical scanner reader on its way to the collator. The optical scanner reader scans the copy and feeds the resulting information to optical character recognition logic which attempts to code as much of the information as possible. Any of the information which is capable of being coded is coded and is then merged with the remainder of the information from the copy upon storage in a buffer memory in preparation for transmission over the communication line. The copy which has been scanned and which enters the collator is routed to a locked compartment at the bottom of the collator defining a mailbox. The mailbox provides a limited access storage compartment from which copies can periodically be removed and delivered to the sender to provide confirmation of transmission of the documents.

Information received via the communication line is temporarily stored in the buffer memory prior to application to the printer portion of the copier-printer to print documents containing such information. The printed documents are circulated to the mailbox where they remain until an authorized person removes them.

The accuracy of original printing in the copier-printer can be verified using the apparatus described in conjunction with a comparator. Information to be printed is stored in the print buffer of the copier-printer and is then applied to the printer to print documents in conventional fashion. The printed documents are scanned by the optical scanner reader and the information derived therefrom is stored in the buffer memory. A comparator is used to compare the information stored in the buffer memory with the original information in the print buffer to verify the accuracy of printing.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figure 1:
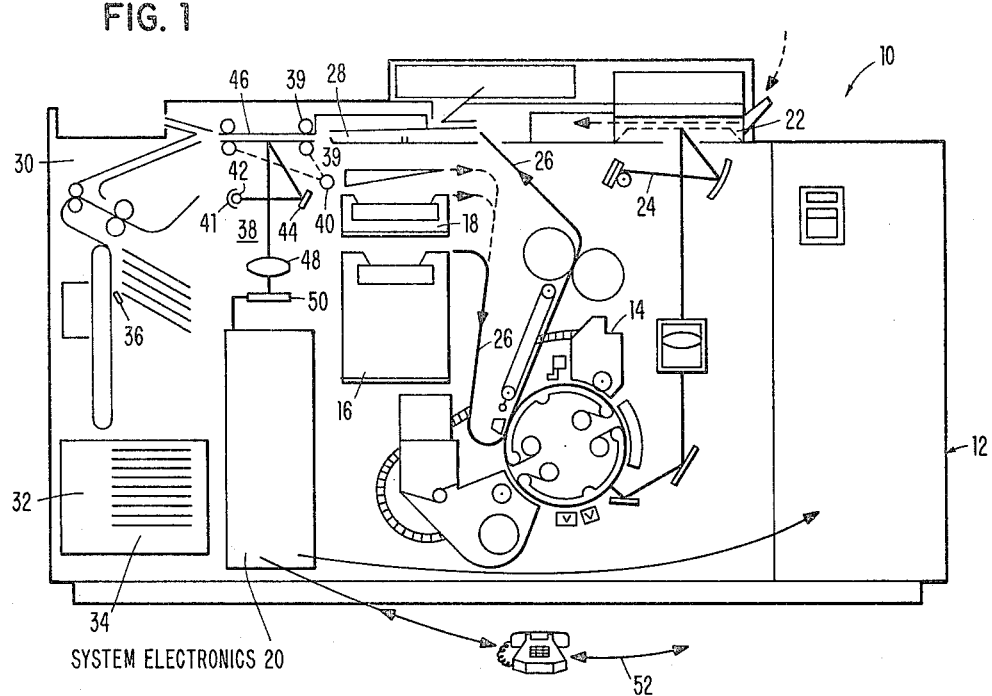
FIG. 1 is a schematic side view of the inside of a copier-printer modified to function as an information transmitting and receiving station in accordance with the invention.

FIG. 1 depicts an information transmitting and receiving station 10 in accordance with the invention. The station 10 is principally comprised of a copier-printer 12 which is modified and which has various other components added thereto in accordance with the invention. The copier-printer 12 comprises an IBM 6670 copier-printer in the present example, but could comprise other copier-printer systems as well.

The copier-printer 12 within the station 10 includes conventional electrostatic apparatus 14 for printing on paper taken from either a primary paper tray 16 or an auxiliary paper tray in the form of a duplex tray 18. The electrostatic apparatus 14 is operative to print information stored in a print buffer within the system electronics 20 onto sheets of paper from the trays 16 or 18 when the copier-printer 12 is functioning as a printer. When the copier-printer 12 is functioning as a copier, documents to be copied are scanned at a document station 22 by a light beam 24 which is provided to the electrostatic apparatus 14 to form a copy of the documents on sheets of paper taken from the trays 16 or 18 in conventional fashion.

The path of paper fetched from one of the trays 16 and 18 and fed through the electrostatic apparatus 14 is shown by a line 26 in FIG. 1. At the output side of the electrostatic apparatus 14, the paper path defined by the line 26 extends through a collator aligner 28 and into a collator 30. The collator 30 is capable of arranging the paper into different sheets or stacks in well known fashion. In the present example the collator 30 has a compartment at the bottom thereof defining a mailbox 32. The mailbox 32 comprises a compartment the access to which is limited by a locked door 34. The door 34 therefore provides limited access to the mailbox 32. Copies entering the collator 30 may be directed to the mailbox 32 at the bottom thereof by a deflecting vane 36 of conventional configuration.

The copier-printer 12 includes an optical scanner reader 38 disposed in the path of paper prior to entry of the paper in the collator 30. The optical scanner reader 38, in the present example, is adapted to read paper documents "on the fly" as the documents are routed from the collator aligner 28 to the collator 30 by the opposing rollers of a paper drive 39 controlled by a servo motor 40. The optical scanner reader 38 includes an elliptical reflector 41 for reflecting light from a lamp 42 onto a mirror 44. The mirror 44 reflects the light from the lamp 42 onto the face of a sheet of paper at a scanning station 46 as the paper is being advanced from the collator aligner 28 to the collator 30. As light from the mirror 44 is scanned across the paper, the light is reflected from the paper through a lens 48 to a diode array 50. The diode array 50 is coupled to the system electronics 20.

Examples of optical scanner readers which can be used as the scanner reader 38 are described in IBM Technical Disclosure Bulletin Vol. 21, No. 9, February 1979, pp. 3546-47, in IBM Technical Disclosure Bulletin Vol. 22, No. 6, November 1979, p. 2250, and in IBM Technical Disclosure Bulletin Vol. 22, No. 2, July 1979, pp. 478-79. As described in the second publication, the diode array 50 typically is coupled through an amplifier to an analog-to-digital converter, then to a thresholding unit, and then to a video store. In the present example the diode array 50 comprises a charge coupled device array sold by Fairchild as No. H121. Such a diode array when coupled in circuit with the scanner reader described in the first publication provides an arrangement capable of scanning documents on the fly and attempting to code the information scanned from the documents.

The system electronics 20 is shown in FIG. 1 as coupled to a communication line which in the present example comprises a telephone line. The information transmitting and receiving station 10 acts as a facsimile system by transmitting facsimiles of documents presented at the document station 22 over the communication line 52 as described hereafter. Document facsimiles received on the communication line 52 are printed by the copier-printer 12 in the manner described hereafter. The copier-printer 12 can also be used in conventional fashion to make copies of documents presented at the document station 22 and to print data provided to a print buffer within the system electronics 20. In accordance with the invention a read-after-write verification procedure is provided for checking the accuracy of documents printed from data provided to the print buffer within the system electronics 20 as described hereafter.

Figure 2:
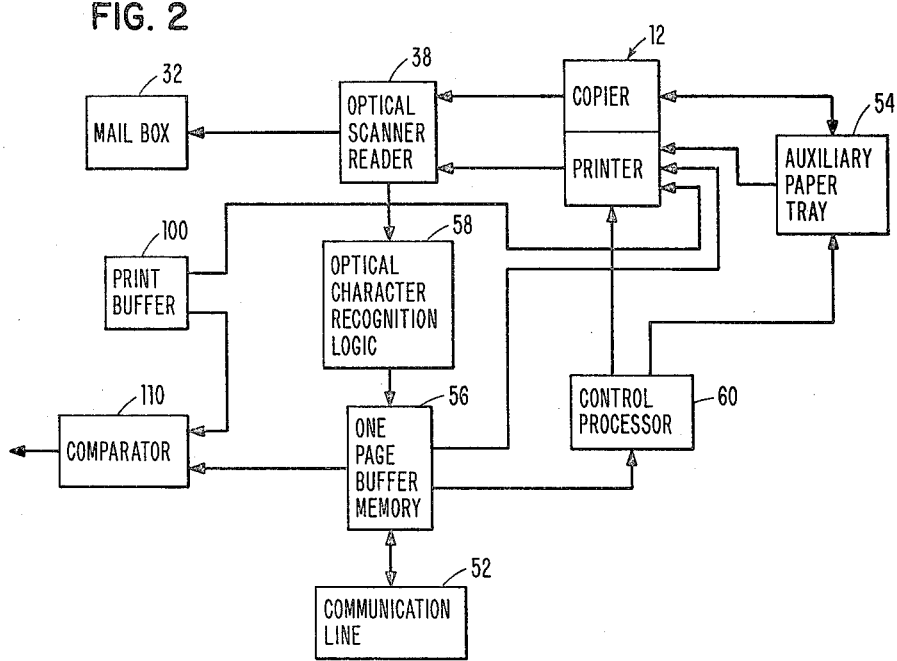
FIG. 2 is a block diagram of the information transmitting and receiving station of FIG. 1.

FIG. 2 comprises a block diagram of a portion of the system electronics 20 in conjunction with the copier-printer 12, the mailbox 32, the optical scanner reader 38 and the communication line 52. In accordance with the invention documents which are to be transmitted over the communication line 52 in facsimile fashion are presented at the document station 22 of the copier-printer 12 where a copy of each document is made in conventional fashion. The copies as so made are circulated to and stored in an auxiliary paper tray 54 which comprises the duplex paper tray 18 in the present example but which may also comprise any other auxiliary trays in the copier-printer aside from the primary paper tray 16. The copies reside in the auxiliary paper tray 54 until the communication line 52 is available. Availability of the communication line 52 is determined by a one page buffer memory 56 coupled between the communication line 52 and optical character recognition logic 58 at the output of the optical scanner reader 38. When the one page buffer memory 56 is empty indicating that at least one page of information can be transmitted over the communication line 52, a copy is fetched from the auxiliary paper tray 54 and routed through the electrostatic apparatus 14 to the collator aligner 28 and then to the scanning station 46. At the scanning station 46 the copy is scanned by the optical scanner reader 38 which is as shown in FIG. 1. The optical character recognition logic 58 comprises the diode array 50 shown in FIG. 1. The character recognition logic 58 attempts to code the information from the copy determined by the scanner reader 38 prior to storage in the one page buffer memory 56. Any information from the scanner reader 38 capable of coding is coded by the character recognition logic 58 and is then merged with the non-coded information in the one page buffer memory 56. The page of information scanned and read from the copy is temporarily stored in the one page buffer memory 56, from which the information is transmitted as serial binary data over the communication line 52.

Each time the one page buffer memory 56 empties, a control processor 60 responds by causing the copier-printer 12 to fetch the next copy stored in the auxiliary paper tray 54 and to advance the copy to the optical scanner reader 38. The copy is scanned and the information thereof passed through the optical character recognition logic 58 to the one page buffer memory 56 in the manner previously described.

The control processor 60 controls various functions of the copier-printer 12 including fetching of copies from the auxiliary paper tray 54. An example of a programmable controller which can be used as the processor 60 is provided by U.S. Pat. No. 4,086,658, David Ernest Finley, INPUT/OUTPUT AND DIAGNOSTIC ARRANGEMENTS FOR PROGRAMMABLE MACHINE CONTROLLERS HAVING MULTI-PROGRAMMING CAPABILITIES.

As each copy is fetched from the auxiliary paper tray 54 and is advanced through the electrostatic apparatus 14 to the optical scanner reader 38, the electrostatic apparatus 14 can be used to print a message on the back of the copy if desired. Such information can be used to identify the copy and the particulars as to when a facsimile of the copy was transmitted over the communication line 52.

As each copy is scanned by the optical scanner reader 38, the copy is advanced through the collator 30 to the mailbox 32. As previously noted the mailbox 32 is normally locked so as to provide controlled, limited access to the transmitted documents. Thus, where the transmitted documents are confidential in nature, the copies made of such documents for purposes of transmission and which are routed to the mailbox 32 upon transmission are controlled as to access thereto. Where desired, the copies can be removed from the mailbox 32 and sent to the sender of the documents as verification of transmission of the documents.

Figure 3:
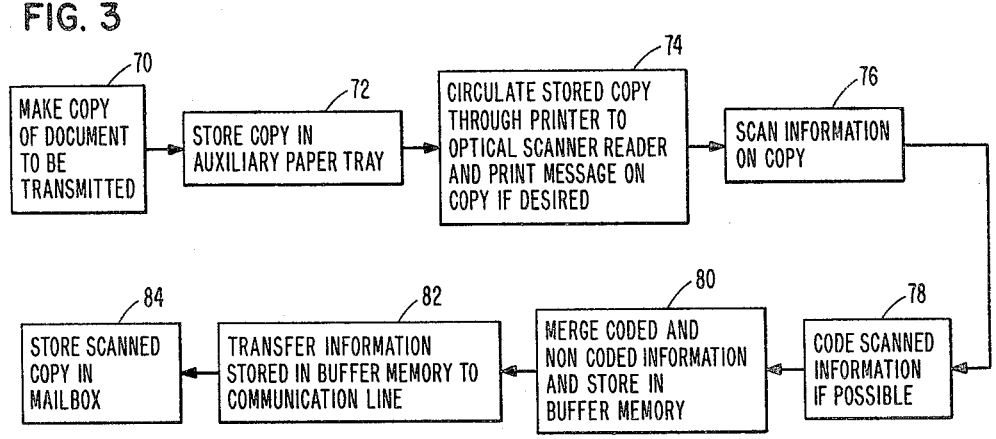
FIG. 3 is block diagram of the successive steps involved in transmitting a document using the station of FIG. 1.

The various steps involved in transmission of a facsimile of a document over the communication line 52 are set forth in FIG. 3. In a first step 70 a document to be transmitted is presented at the document station 22 and the electrostatic apparatus 14 is used to make a copy of the document in conventional fashion. In a second step 72 the copy is stored in the auxiliary paper tray 54 comprising the duplex tray 18 or other auxiliary tray. When the control processor 60 determines that the one page buffer memory 56 is empty, a third step 74 is carried out in which the copy is fetched from the auxiliary paper tray 54 and is circulated through the copier-printer 12 to the optical scanner reader 38. As the copy passes through the electrostatic apparatus 14, a special message can be printed on the back of the copy as previously described.

In a next step 76 the information on the copy is scanned by the optical scanner reader 38 and the information is coded by the optical character recognition logic 58 in a next step 78 to the extent that such coding is possible. In a next step 80 any information coded by the optical character recognition logic 58 is merged with the remaining noncoded information in the one page buffer memory 56. In the next step 82 the information stored in the one page buffer memory 56 is advanced to the communication line 52 in serial fashion for transmission over the communication line. The logic to perform the function of steps 78 and 80 is standard and well known structure to those skilled in the art, and it may take a variety of forms. U.S. Pat. No. 4,091,424 is exemplary. In a final step 84 the copy which has been scanned by the optical scanner reader 38 at the scanning station 46 of the copier-printer 12 is routed through the collator 30 to the mailbox 32.

The process depicted in FIG. 3 is repeated each time the control processor 60 determines that the one page buffer memory 56 is empty and as long as there are copies in the auxiliary paper tray 54 containing information to be transmitted.

It will be appreciated by those skilled in the art that the information transmitting and receiving station 10 in accordance with the invention provides a number of advantages over prior art systems including the ability to store documents to be transmitted as copies of the original documents so that the original documents can be removed from the copier-printer 12 as soon as the copies are made. Also in accordance with the invention, document facsimiles communicated over the communication line 52 to the information transmitting and receiving station 10 are converted into copies of the documents using the copier-printer 12. The steps involved in such process are set forth in FIG. 4.

Figure 4:
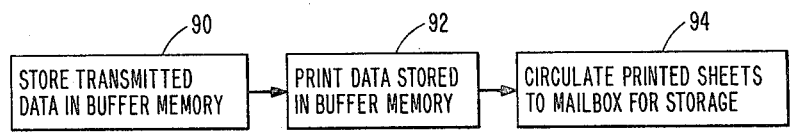
FIG. 4 is a block diagram of the successive steps involved in receiving information using the station of FIG. 1.

Referring to FIG. 4 in conjunction with FIGS. 1 and 2, data transmitted over the communication line 52 is stored in the one page buffer memory 56 in a first step 90. The control processor 60 senses the presence of transmitted data in the memory 56 and causes such data to be advanced to the printer portion of the copier-printer 12 where the data is printed in a second step 92. In a next step 94 the printed data is advanced from the electrostatic apparatus 14 past the scanning station 46 to the mailbox 32. Since the mailbox 32 has limited access thereto, confidential documents can be transmitted to the information transmitting and receiving station 10 at any time without fear of such document falling into the wrong hands. It is a simple matter to remove such documents from the mailbox 32 using authorized personnel at an appropriate time.

Figure 5:
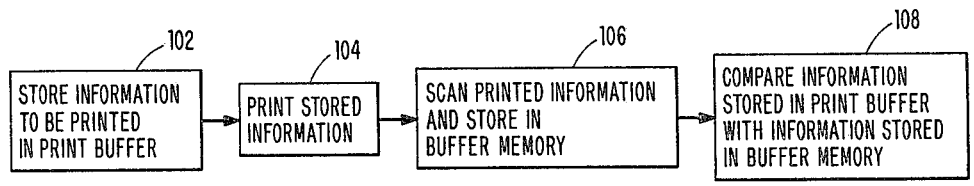
FIG. 5 is a block diagram of the successive steps involved in verifying the accuracy of original printing utilizing the station of FIG. 1.

In accordance with an aspect of the invention the optical scanner reader 38 can be used in conjunction with the optical character recognition logic 58 and the one page buffer memory 56 to verify the accuracy of conventional printing performed by the copier-printer 12. The copier-printer 12 includes a print buffer 100 in the system electronics 20 thereof in which data to be printed is stored in conventional fashion. This data is then advanced to the copier-printer 12 where it is printed. The accuracy and legibility of such printing may be affected by many factors including such things as the amount of toner present in the electrostatic apparatus 14. Accordingly, a read-after-write process for verifying the accuracy of the printing is set forth in FIG. 5. In a first step 102 the data to be printed is stored in the print buffer 100. In a second step 104 the data is advanced from the print buffer 100 to the copier-printer 12 where the information is printed. Upon printing, the printed copies are advanced past the scanning station 46 to the collator 30. At the scanning station 46 the printed copies are scanned by the optical scanner reader 38. The scanned information is passed via the optical character recognition logic 58 to the one page buffer memory 56 in a series of operations shown as a next step 106. In a final step 108 the information as read from the printed copies and stored in the buffer memory 56 is compared with the original print information in the print buffer 100 by a comparator 110. The output of the comparator 110 indicates whether the printed data is accurate and legible or whether the copier-printer must be repaired or further attempt made to print the information in the print buffer 100.

While the invention has been particularly shown and described with reference to a preferred embodiment thereof, it will be understood by those skilled in the art that various changes in form and details may be made therein without departing from the spirit and scope of the invention.

What is claimed is:

1. A method of providing for delayed transmission of information contained in a multipage document without requiring a delay in manual operation upon the document itself, comprising the steps of:
   providing a multipage document containing information to be transmitted;
   providing a copier having a concealed paper storage tray and an optical scanner;
   making a visually perceptible paper copy of the document by immediate manual use of said copier;
   automatically storing the paper copy in the copier's paper tray, without manual intervention, as said copy is made;
   thereafter, and with possible delay, automatically fetching the paper copy stored in the copier's paper tray, without manual intervention, and delivering the copy to the optical scanner, to thereby scan the paper copy to determine visually perceptible information contained therein; and
   automatically, and without manual intervention, transmitting the information contained in the paper copy.

2. The invention set forth in claim 1, comprising the further step of temporarily storing the information contained in the paper copy, after scanning thereof, until a determination is automatically made that the information can be transmitted.

3. The invention set forth in claim 1, comprising the further steps of automatically coding any information determined by scanning the paper copy which can be coded and then automatically merging any coded information with the remainder of the information.

4. A method of electronically transmitting information contained in a visually perceptible document, which method provides for the possibility of delayed transmission, which delay is not apparent to the individual manually handling the document, comprising the steps of:
   providing a document containing information to be transmitted, and a copier having first and second concealed paper trays and an optical scanner;
   manually handling the document and using the copier to make a visually perceptible copy of the document on paper taken from the first paper tray;
   automatically storing the copy in the second paper tray without manual intervention;
   automatically taking the copy from the second paper tray, without manual intervention, and scanning the copy with the copier's optical scanner to determine the visually perceptible information contained in the copy; and
   electronically transmitting the information determined by scanning the copy, which transmission occurs without manual intervention, and at variable time intervals after manual handling of the document has been completed.

5. The invention set forth in claim 4, comprising the further steps of coding that part of the information contained in the copy which can be coded, merging any coded part of the information with the remainder of the information and temporarily storing the merged information.

6. A method of verifying information to be printed comprising the steps of:
   providing information to be printed;
   storing the information to be printed;
   printing the information on a record carrier while continuing to store the information;
   optically scanning the record carrier to determine information printed thereon; and
   comparing the information determined by optically scanning with the stored information to be printed to determine if they are the same.

7. The invention set forth in claim 6, comprising the further step of storing the information determined by optically scanning, and wherein the step of comparing the information comprises comparing the stored information determined by optically scanning with the stored information to be printed.

8. Apparatus for transmitting information contained in a document comprising the combination of:
   a copier for manually making a visually perceptible copy of a document containing visually perceptible information to be transmitted;
   a concealed storage tray associated with the copier for storing the copy;
   an optical scanner integral with the copier;
   means for automatically fetching the copy stored in the storage tray, without manual intervention, and delivering the copy to the optical scanner, the optical scanner being operative to automatically scan the copy to determine visually perceptible information contained therein; and a communication line coupled to said optical scanner to receive the information determined to be contained in the copy.

9. The invention set forth in claim 8, further including a limited access container associated with the copier for receiving the copy from the optical scanner.

10. The invention set forth in claim 8, further including a buffer memory coupled between the optical scanner and the communication line and operative to store information determined to be contained in the copy.

11. The invention set forth in claim 10, further including character recognition logic coupled between the optical scanner and the buffer memory and operative to code characters recognized in the information determined to be contained in the copy, the coded characters being merged with the remainder of the information in the buffer memory.

12. The invention set forth in claim 10, further including a printer associated with the copier and coupled to said communication line to receive information to be printed which is stored in the buffer memory, and a limited access container coupled to the printer for receiving printed information as stored in the buffer memory and as printed by the printer.

13. Apparatus for printing information and verifying the accuracy of printing comprising the combination of:
a print buffer for storing information to be printed;
a printer coupled to the print buffer and operative to print information stored in the print buffer;
an optical scanner operative to scan information printed by the printer;
a buffer memory coupled to the optical scanner and operative to store information scanned by the optical scanner; and
a comparator coupled to the print buffer and the buffer memory and operative to compare information stored in the buffer memory with information stored in the print buffer.

14. An information processing station comprising the combination of:
a copier having a primary paper tray, a duplex paper tray and a copier exit compartment, the copier being operative to copy an original document onto paper taken from the primary paper tray and to store the copy in the duplex tray, the copier being further operative to thereafter circulate the copy from the duplex tray to the copy exit compartment;
an optical scanner reader disposed to scan copies as they are circulated from the duplex tray to the copier exit compartment;
an optical character recognition logic circuit coupled to the optical scanner reader; and
a buffer memory coupled to the optical character recognition logic circuit.

15. The invetion set forth in claim 14, wherein the copier includes a printer capable of printing information on paper taken from both the primary paper tray and the duplex paper tray.

16. The invention set forth in claim 15, wherein the printer is coupled to the buffer memory and is operative to print information received by the buffer memory.

17. The invention set forth in claim 15, wherein the printer includes a print buffer for storing information to be printed, and further including a comparator having inputs coupled to the print buffer and to the buffer memory.

* * * * *